US008489857B2

(12) United States Patent
Hobson et al.

(10) Patent No.: US 8,489,857 B2
(45) Date of Patent: Jul. 16, 2013

(54) PROCESSOR CLUSTER ARCHITECTURE AND ASSOCIATED PARALLEL PROCESSING METHODS

(75) Inventors: Richard F. Hobson, Coquitlam (CA); Bill Ressl, Vancouver (CA); Allan R. Dyck, Port Moody (CA)

(73) Assignee: Schism Electronics, L.L.C., Wilmington, DE (US)

( * ) Notice: Subject to any disclaimer, the term of this patent is extended or adjusted under 35 U.S.C. 154(b) by 81 days.

(21) Appl. No.: 12/940,799

(22) Filed: Nov. 5, 2010

(65) Prior Publication Data

US 2011/0047354 A1 Feb. 24, 2011

Related U.S. Application Data

(63) Continuation of application No. 11/468,826, filed on Aug. 31, 2006, now Pat. No. 7,840,778, which is a continuation of application No. 11/255,597, filed on Oct. 20, 2005, now Pat. No. 7,210,139, which is a continuation of application No. 10/369,182, filed on Feb. 18, 2003, now Pat. No. 6,959,372.

(60) Provisional application No. 60/358,133, filed on Feb. 19, 2002, provisional application No. 60/358,290, filed on Feb. 19, 2002.

(51) Int. Cl.
*G06F 9/00* (2006.01)

(52) U.S. Cl.
USPC .............................................. 712/10; 712/16

(58) Field of Classification Search
USPC ................................ 718/102, 104; 712/10, 16
See application file for complete search history.

(56) References Cited

U.S. PATENT DOCUMENTS

| 3,537,074 A | 10/1970 | Sankin et al. |
| 4,351,025 A | 9/1982 | Hall, Jr. |
| 4,571,672 A | 2/1986 | Hatada et al. |
| 4,912,633 A | 3/1990 | Schweizer et al. |
| 4,943,912 A | 7/1990 | Aoyama et al. |
| 5,121,498 A | 6/1992 | Gilbert et al. |
| 5,303,369 A | 4/1994 | Borcherding et al. |
| 5,349,656 A * | 9/1994 | Kaneko et al. ................ 718/102 |
| 5,555,425 A | 9/1996 | Zeller et al. |
| 5,586,258 A | 12/1996 | Conterno et al. |

(Continued)

OTHER PUBLICATIONS

Final Office Action on U.S. Appl. No. 11/496,746, mailed Jul. 23, 2007.

(Continued)

*Primary Examiner* — Andrew Caldwell
*Assistant Examiner* — Benjamin Geib

(57) ABSTRACT

A parallel processing architecture comprising a cluster of embedded processors that share a common code distribution bus. Pages or blocks of code are concurrently loaded into respective program memories of some or all of these processors (typically all processors assigned to a particular task) over the code distribution bus, and are executed in parallel by these processors. A task control processor determines when all of the processors assigned to a particular task have finished executing the current code page, and then loads a new code page (e.g., the next sequential code page within a task) into the program memories of these processors for execution. The processors within the cluster preferably share a common memory (1 per cluster) that is used to receive data inputs from, and to provide data outputs to, a higher level processor. Multiple interconnected clusters may be integrated within a common integrated circuit device.

52 Claims, 6 Drawing Sheets

U.S. PATENT DOCUMENTS

| | | | |
|---|---|---|---|
| 5,687,329 | A | 11/1997 | Kaiser et al. |
| 5,734,921 | A | 3/1998 | Dapp et al. |
| 5,752,264 | A | 5/1998 | Blake et al. |
| 5,805,915 | A * | 9/1998 | Wilkinson et al. ............... 712/20 |
| 5,828,894 | A * | 10/1998 | Wilkinson et al. ............... 712/20 |
| 5,832,216 | A | 11/1998 | Szczepanek |
| 5,857,084 | A | 1/1999 | Klein |
| 5,881,254 | A | 3/1999 | Corrigan et al. |
| 5,941,973 | A | 8/1999 | Kondo et al. |
| 6,041,379 | A | 3/2000 | Sher |
| 6,052,752 | A | 4/2000 | Kwon |
| 6,055,599 | A | 4/2000 | Han et al. |
| 6,092,173 | A | 7/2000 | Sasaki et al. |
| 6,131,153 | A | 10/2000 | Takamatsu |
| 6,138,200 | A | 10/2000 | Ogilvie |
| 6,151,663 | A | 11/2000 | Pawlowski et al. |
| 6,167,475 | A | 12/2000 | Carr |
| 6,205,522 | B1 | 3/2001 | Hudson et al. |
| 6,212,589 | B1 | 4/2001 | Hayek et al. |
| 6,338,122 | B1 | 1/2002 | Baumgartner et al. |
| 6,339,788 | B1 | 1/2002 | Geyer et al. |
| 6,351,781 | B1 | 2/2002 | Gracias et al. |
| 6,393,500 | B1 | 5/2002 | Thekkath |
| 6,434,590 | B1 * | 8/2002 | Blelloch et al. ............... 718/102 |
| 6,446,151 | B1 | 9/2002 | Fischer et al. |
| 6,467,002 | B1 | 10/2002 | Yang |
| 6,493,776 | B1 | 12/2002 | Courtright et al. |
| 6,502,150 | B1 | 12/2002 | Bogin et al. |
| 6,526,462 | B1 | 2/2003 | Elabd |
| 6,550,022 | B1 | 4/2003 | Faver |
| 6,598,130 | B2 | 7/2003 | Harris et al. |
| 6,604,159 | B1 | 8/2003 | Thekkath et al. |
| 6,622,214 | B1 | 9/2003 | Vogt et al. |
| 6,628,662 | B1 | 9/2003 | Blackmon et al. |
| 6,631,447 | B1 | 10/2003 | Morioka et al. |
| 6,636,950 | B1 | 10/2003 | Mithal et al. |
| 6,658,448 | B1 * | 12/2003 | Stefaniak et al. ............... 718/104 |
| RE38,388 | E | 1/2004 | Sarangdhar et al. |
| 6,704,842 | B1 | 3/2004 | Janakiraman et al. |
| 6,721,833 | B2 | 4/2004 | Lai et al. |
| 6,738,845 | B1 | 5/2004 | Hadwiger et al. |
| 6,748,505 | B1 | 6/2004 | Dakhil |
| 6,785,793 | B2 | 8/2004 | Aboulenein et al. |
| 6,799,254 | B2 | 9/2004 | Oldfield et al. |
| 6,813,767 | B1 | 11/2004 | Willke |
| 6,842,845 | B2 | 1/2005 | Ganapathy et al. |
| 6,868,486 | B1 | 3/2005 | Ward |
| 6,892,266 | B2 | 5/2005 | Reimer et al. |
| 6,920,519 | B1 | 7/2005 | Beukema et al. |
| 6,959,372 | B1 | 10/2005 | Hobson et al. |
| 6,973,093 | B1 | 12/2005 | Briddell et al. |
| 7,065,595 | B2 | 6/2006 | Dreup et al. |
| 7,085,866 | B1 | 8/2006 | Hobson et al. |
| 7,107,383 | B1 | 9/2006 | Rajan |
| 7,174,401 | B2 | 2/2007 | Stuber et al. |
| 7,210,139 | B2 | 4/2007 | Hobson et al. |
| 7,249,210 | B2 | 7/2007 | Ganasan et al. |
| 7,469,308 | B2 | 12/2008 | Hobson et al. |
| 2001/0003834 | A1 | 6/2001 | Shimonishi |
| 2001/0046237 | A1 | 11/2001 | Chan et al. |
| 2001/0054079 | A1 | 12/2001 | Hagersten et al. |
| 2002/0004886 | A1 | 1/2002 | Hagersten et al. |
| 2002/0052914 | A1 | 5/2002 | Zalewski et al. |
| 2002/0083243 | A1 | 6/2002 | Van Huben et al. |
| 2002/0157035 | A1 | 10/2002 | Wong et al. |
| 2002/0194435 | A1 | 12/2002 | Yamagami et al. |
| 2003/0097530 | A1 | 5/2003 | Arimilli et al. |
| 2004/0103263 | A1 | 5/2004 | Colavin et al. |
| 2005/0033941 | A1 | 2/2005 | Joyce et al. |
| 2009/0106468 | A1 | 4/2009 | Hobson et al. |

OTHER PUBLICATIONS

Final Office Action on U.S. Appl. No. 12/341,778, mailed Jan. 5, 2011.

Non-Final Office Action on U.S. Appl. No. 11/496,746, mailed Feb. 8, 2007.

Non-Final Office Action on U.S. Appl. No. 10/369,182, mailed Feb. 15, 2005.

Non-Final Office Action on U.S. Appl. No. 11/468,826, mailed Nov. 25, 2009.

Non-Final Office Action on U.S. Appl. No. 11/496,746, mailed Feb. 6, 2008.

Non-Final Office Action on U.S. Appl. No. 12/341,778, mailed Mar. 21, 2011.

Non-Final Office Action on U.S. Appl. No. 12/341,778, mailed Jul. 21, 2010.

Notice of Allowance on U.S. Appl. No. 10/369,182, mailed Jun. 10, 2005.

Notice of Allowance on U.S. Appl. No. 11/468,826, mailed Jun. 25, 2010.

Notice of Allowance on U.S. Appl. No. 11/496,746, mailed Aug. 20, 2008.

Notice of Allowance on U.S. Appl. No. 12/341,778, mailed Sep. 13, 2011.

* cited by examiner

EXAMPLES OF POSSIBLE CODE PAGE BOUNDARY LOCATIONS

PROCESSOR CLUSTER ARCHITECTURE AND ASSOCIATED PARALLEL PROCESSING METHODS

RELATED APPLICATIONS

This application is a continuation of U.S. application Ser. No. 11/468,826 filed Aug. 31, 2006, and issued on Nov. 23, 2010 as U.S. Pat. No. 7,840,778. U.S. application Ser. No. 11/468,826 is a continuation of U.S. application Ser. No. 11/255,597, filed Oct. 20, 2005, and issued on Apr. 24, 2007 as U.S. Pat. No. 7,210,139. U.S. application Ser. No. 11/255,597 is a continuation of U.S. application Ser. No. 10/369,182, filed on Feb. 18, 2003, and issued on Oct. 25, 2005 as U.S. Pat. No. 6,959,372. U.S. application Ser. No. 10/369,182 claims the benefit of U.S. Provisional Appl. Nos. 60/358,133 and 60/358,290, both filed on Feb. 19, 2002. The entire contents of the disclosures of the 60/358,133; 60/358,290; 10/369,182; 11/255,597; and 11/468,826 applications are hereby incorporated herein by reference.

BACKGROUND OF THE INVENTION

1. Field of the Invention

The present invention relates to computer architectures for the parallel processing of data.

2. Description of the Related Art

The Multiple-Instruction Multiple Data (MIMD) parallel computer model is a general purpose model which supports different software algorithms running on different processors. If several of the processors are executing the same piece of software, there could be unnecessary duplication of program memory, or congestion related to fetching instructions from a common shared memory. Program memory caching is a common way to help alleviate this situation, but as the number of processors grows, the caching technique may become less effective. Instruction caching is also quite complex, tending to increase silicon area and processor power consumption. Systems-On-Chip (SOCs) have limited silicon area, processor speed, and power, and should avoid wasting any of these resources.

Some data manipulation algorithms lead one to consider the Single-Instruction Multiple-Data (SIMD) parallel computer model. This model assumes that most of the time the same computer instruction can be applied to many different sets of data in parallel. If this assumption holds, SIMD represents a very economical parallel computing paradigm. However, some complicated algorithms have many data dependent control structures which would require multiple instruction streams for various periods of time. Adding to this complication is the possible need to support multiple algorithms simultaneously, each of which may operate on a different set of (independent) data. Thus, large amounts of program memory may be needed.

SUMMARY OF THE INVENTION

The present invention provides a parallel processing architecture that offers a high level of performance without the need for large amounts of redundant program memory. In a preferred embodiment, a plurality of processors are coupled to a common code distribution bus to form a processor cluster. The code distribution bus is used to download or dispatch code pages (blocks of code) to the processors for execution—preferably from a common program memory. The processors are also coupled to a shared memory that is used to receive inputs (including data sets to be processed) and to provide outputs to other processing entities. A number of interconnected processor clusters may be integrated within a common integrated circuit device.

Each processor only needs enough program memory to store a single code page at a time. Typically, each processor has a local program memory that is between about 1K (1024) and 4K instructions in size. For processors that use four-byte instructions, this results in program memories of 4K to 16K bytes in size. Although each processor preferably has its own respective program memory, two or more processors may alternatively share a local program memory.

A program or task to be executed by the cluster is initially subdivided into multiple code pages by selecting appropriate boundary locations. The code page boundaries are preferably selected such that (1) each code page may be fully loaded into the program memory of one of the cluster's processors, (2) major program loops are fully contained within code pages (so that frequent code page "swaps" are not needed), and (3) execution of the program or task proceeds in a predictable order from one code page to the next.

The cluster of processors may optionally be subdivided into two or more groups ("task groups") for purposes of executing tasks. For example, a cluster of eight processors may be subdivided into two four-processor task groups, one of which continuously executes a first task and the other of which continuously executes a second task. The tasks may, for example, include voice processing algorithms that are continuously applied in real time to voice channels, although other applications are possible. The processors within a task group execute code pages in parallel, and each such processor typically processes a different set or collection of data. Task groups may also be formed that include processors from multiple clusters.

In operation according to one embodiment, a task control processor broadcasts a code page over the code distribution bus to all processors within a task group. This code page is stored within the respective program memories of each of the processors in the task group, and each such processor executes the code page from its respective memory. Once all processors within the task group have finished executing the code page, the task control processor broadcasts the next code page of the assigned task to these processors for execution. Execution of the task proceeds in this manner until all code pages of the task have been executed, at which point the task may be repeated (applied to a new data set) or terminated. In some cases, a single code page may be adequate for a complete task, so that once execution starts there is no need to load additional pages.

One aspect of the invention is thus a parallel processing architecture comprising a plurality of processors that share a common code distribution bus. Pages or blocks of code are concurrently loaded into respective program memories of these processors over the code distribution bus, and are executed in parallel by the processors. The plurality of processors may, but need not, be a subset of a larger cluster of processors that share a common code distribution bus. The plurality of processors preferably share a common memory (1 per cluster) that is used to receive data inputs and to provide data outputs. A task control processor preferably detects when all of the plurality of processors have finished executing the code page, and then loads a new code page (e.g., the next sequential code page within a task) into the processors' respective memories for execution.

Another aspect of the invention is a method for subdividing a task (code sequence) into a plurality of code pages to be executed by one or more processors within a cluster (or spread across multiple clusters). The task is preferably subdivided into code pages such that the code pages may be loaded and executed in an order that is known prior to execution. In addition, each code page is preferably sufficiently small in size to fit within a program memory of a processor of the cluster. Any program loops of the task are preferably fully contained within the code pages, such that execution proceeds sequentially from one code page to the next when the task is executed.

Yet another aspect of the invention is an architecture that supports the ability for processors within a cluster to be assigned or allocated to tasks to form two or more task groups. Preferably, each processor includes a task ID register that may be loaded with a task number. When a code page is broadcast on the code distribution bus in association with a particular task, all processors assigned to that task (e.g., all processors having the corresponding task number in their respective task ID registers) respond by receiving and executing the code page.

Neither this summary nor the following detailed description section is intended to define the invention. The invention is defined by the claims.

BRIEF DESCRIPTION OF THE DRAWINGS

The above and other features of the invention will now be described with reference to the drawings summarized below. These drawings and the associated description are of a preferred embodiment of the invention, and are not intended to limit the scope of the invention.

DETAILED DESCRIPTION OF PREFERRED EMBODIMENTS

Figure 1:
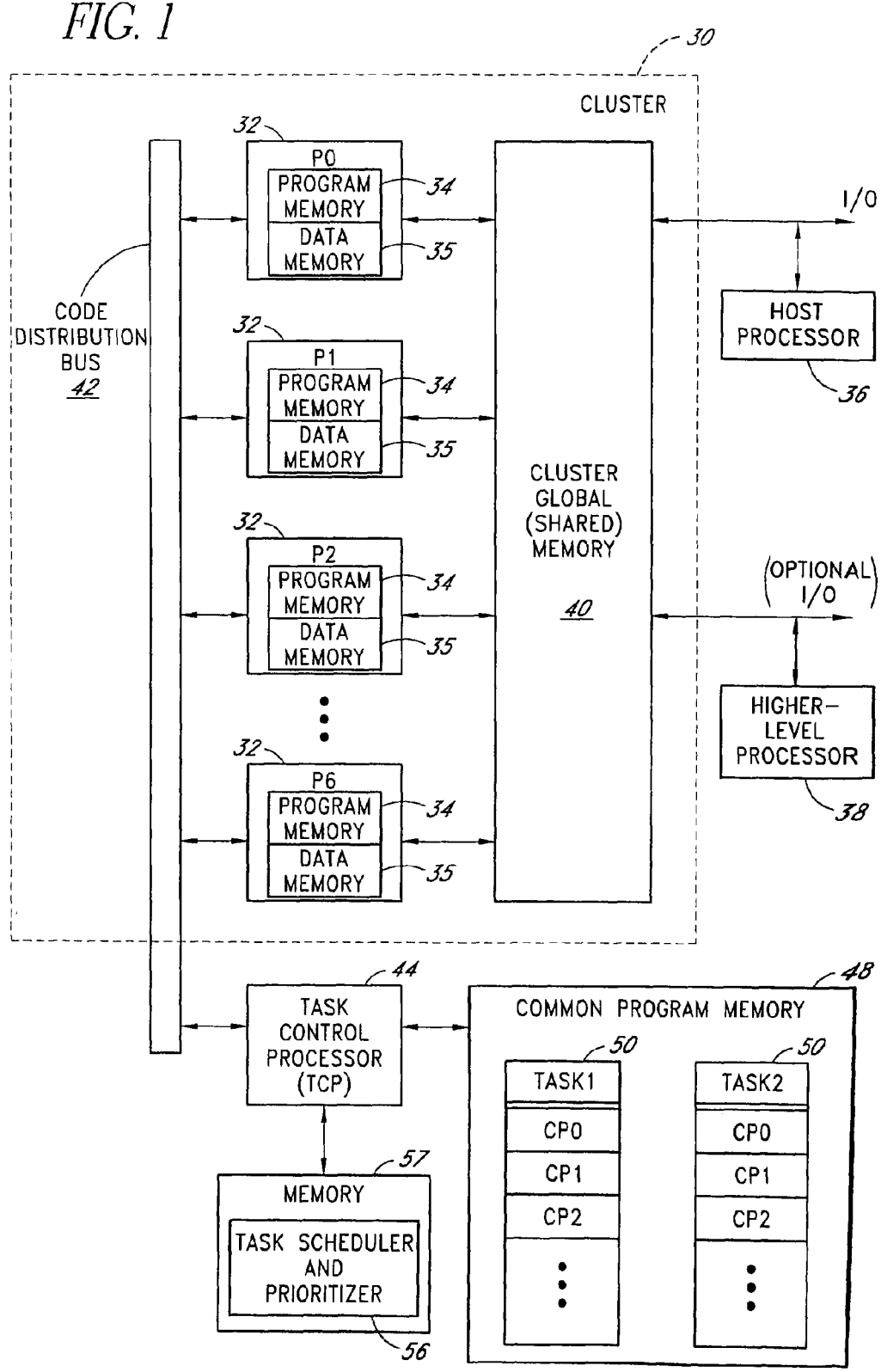
FIG. 1 illustrates a processor cluster architecture according to one embodiment of the invention.

FIG. 1 illustrates a parallel processing architecture according to one embodiment of the invention. This architecture combines some of the best features of SIMD, MIMD, and multitasking, and takes into account the need for modularity in System-On-Chip (SOC) products. As will be apparent, the architecture is particularly well suited for processing multiple instances of independent data streams or sets. Examples of applications for which the architecture may be used include voice channel processing, multi-channel data encryption, and 3G wireless base station receiver/transmitter functions.

As illustrated, the architecture comprises a cluster 30 of processors 32 (P0-P6), each of which has its own local program memory 34, local data memory 35, and a shared cluster global memory 40. Multiple clusters 30 of this type may be provided within a single SOC or other silicon device. For example, as described below with reference to FIG. 6, multiple clusters 30 may be arranged and interconnected in a hierarchy within a single integrated circuit device.

The processors 32, which may be referred to as "cluster processors," preferably access a cluster global memory 40 that is used to communicate with other entities, such as a host processor 36 or other higher-level processors 38 that control the overall operation of the cluster 30. The global memory's interface is shown with nine ports, seven for the cluster processors P0-P6 and two for input/output (I/O). Although seven cluster processors 32 are shown in this example, a greater or lesser number (L) of processors 32 (typically between 4 and 12) may be used per cluster 30. In addition, the global memory's interface may include additional higher-level processors 38.

As illustrated, each cluster processor 32 is coupled to a common code distribution bus 42. This bus 42 is used to dispatch "code pages," or short sequences of code, to individual processors 32 for execution. The code page being executed by a given processor 32 is stored within that processor's local program memory 34. Each local program memory is typically only large enough to hold a single code page at a time. As described below, an important aspect of the design is that a code page may be dispatched to (loaded into the local program memories 34 of) multiple cluster processors 32 at one time.

Although each processor 32 is shown as having its own local program memory 34, a single local program memory 34 may alternatively supply instructions to two or more cluster processors 32, thereby conserving even more silicon. To avoid performance loss, such a memory would preferably deliver instructions at two or more times the normal rate, such as by fetching two or more instructions at a time.

The task of dispatching the code pages to the processors 32 is performed by a task control processor (TCP) 44. The cluster processors 32, the task control processor 44, the host processor 36, and the higher-level processors 38, may be Pipelined Embedded Processors (PEP™) as described in Hobson et al, "An Embedded-Processor Architecture for Parallel DSP Algorithms," Advanced Signal Processing Algorithms, Architectures, and Implementation Conference, Denver Colo., August 1996, pp. 75-85, the disclosure of which is incorporated herein by reference. Other types of microprocessors may additionally or alternatively be used.

The task control processor 44 dispatches code pages to the processors 32 by reading the code pages from a common program memory 48, and broadcasting these code pages one-at-a-time on the code distribution bus 42. As illustrated in FIG. 1, the code pages are stored in the common program memory 48 in sequences (CP0, CP1, . . . ), where each sequence of code pages represents a program or task 50 that is executed by the cluster processors 32. In one embodiment, the common program memory 48 is located on the same chip as the various processors 32, 36, 38, 44. In other embodiments, the common program memory may be off chip, or there may be both on and off chip memories for program code.

Figure 6:
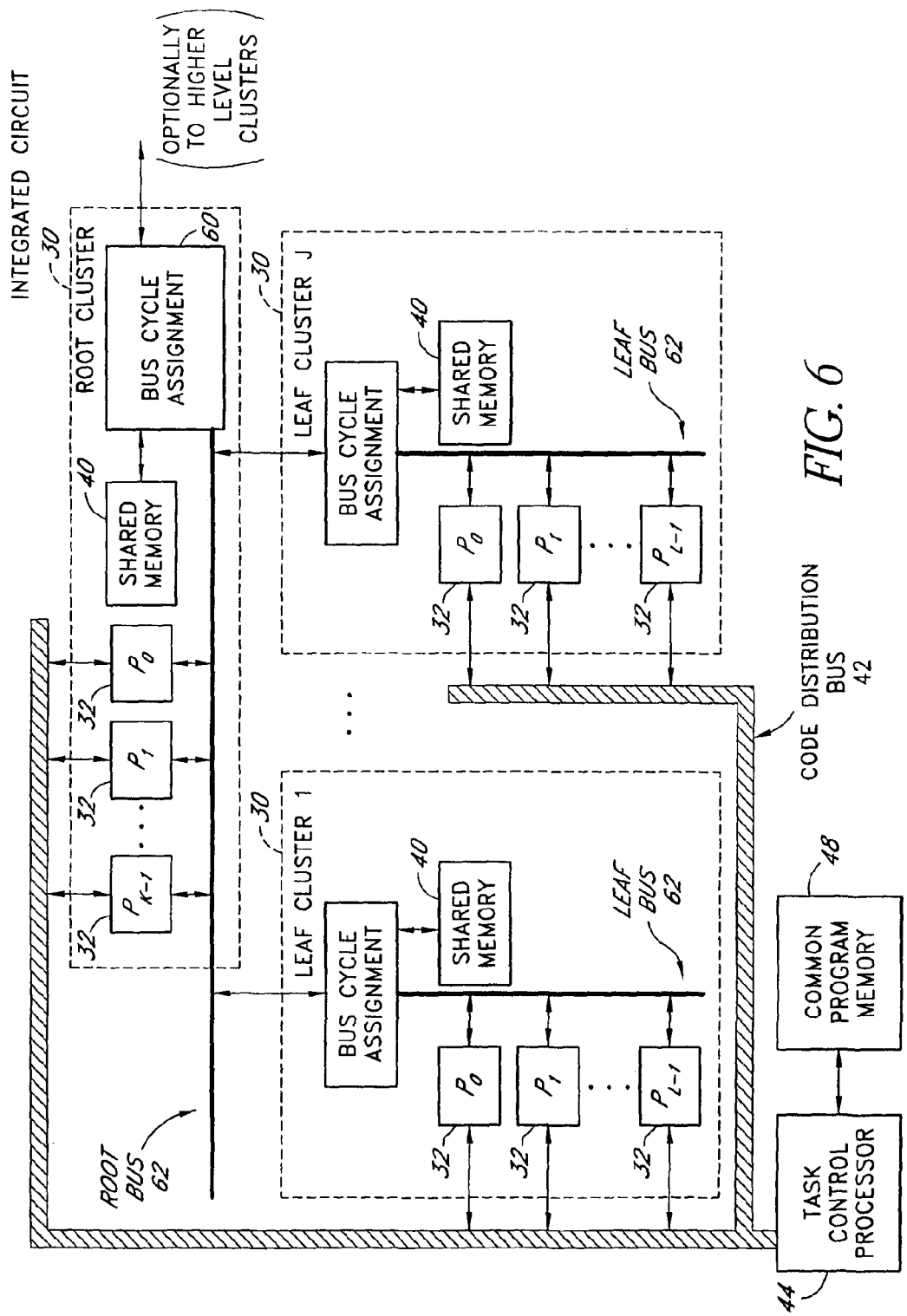
FIG. 6 illustrates how multiple processor clusters of the type shown in FIG. 1 may be arranged hierarchically within an integrated circuit.

A single task control processor 44, code distribution bus 42, and common program memory 48 may be used to dispatch code pages to the cluster processors 32 of many different clusters 30, such as all clusters on a single SOC device (see FIG. 6). Alternatively, one or more additional task control processors 44, code distribution buses 42, and common program memories 48 may be provided within a given IC device to reduce loading.

In one embodiment, each processor 32 is suspended while code pages are being loaded into its program memory 34. In another embodiment, the processors 32 are able to continue execution while code pages are being loaded into their program memories 34. This may be accomplished by splitting the program memory 34 into two parts so that the processor can execute from one part while the other part is being reloaded. The parts may be different in size.

A given code page may be simultaneously dispatched over the code distribution bus 42 to any number of cluster processors 32 for execution. Specifically, the task control processor 44 may broadcast a given code page on the code distribution bus 42 to concurrently load that code page into the local program memories 34 of some or all of the cluster's processors 32, and possibly into the local program memories of processors 32 within other clusters 30. In the preferred embodiment, a code page transmitted on the code distribution bus 42 will be loaded into local program memories 42 of all cluster processors 32 assigned to the corresponding task 50. The group of processors 32 assigned to a particular task 50 (or possibly to a set of tasks) is referred to as a "task group." A given task group may, but need not, span (include processors from) multiple clusters 30. As described below, each cluster processor 32 may be programmed with an identifier that specifies the task or task group to which it is currently assigned.

After a code page has been stored in each participating processor's respective program memory 34, the processors 32 asynchronously execute the code page to completion—typically to process their own respective data set or sets. Once all processors 32 within the task group have finished executing a code page, the task control processor 44 broadcasts the next sequential code page of the assigned task to these processors 32 for execution. Execution of the task proceeds in this manner until all code pages of the task have been executed, at which point the task may be repeated (applied to new data sets) or terminated.

As mentioned above, each code page is typically a subset or block of a larger algorithm or program 50 being executed by a task group. To efficiently use the illustrated architecture, the program is preferably divided into code pages so as to achieve the following properties: (1) program loops are permitted as long as they are contained within respective code pages; (2) each code page is executed only a few times (and ideally once) per data set, (3) program execution proceeds sequentially (in a predictable order) from one code page to the next. Property (1), which may be relaxed in some cases, e.g. by loop unrolling, allows each code page to be executed to completion before it is replaced within the relevant processor's program memory 34. The optimum code page size used to subdivide a program 50 is a design parameter that typically varies from program to program.

The size of the local program memories 34 may be selected based on the optimum memory sizes for the different applications that will be executed by the cluster. Since different applications typically have different optimum memory sizes, a compromise may be appropriate in which the program memories are selected to be slightly smaller than or equal to the largest optimum memory size.

The sizes of the local data memories 35 may be selected based on the amount of execution state information that will be stored, as well as the number of independent data sets that will be kept in whole or in part. The latter depends on how many data sets a processor 32 can manage in real-time. Although the illustrated embodiment uses separate local memories 34, 35 for program code versus data (as is the case for a Harvard architecture), a shared local memory may alternatively be used.

An important benefit of the foregoing method of subdividing the program is that it allows relatively small local program memories 34 to be used (e.g., 1K to 4K instructions, and more typically 1.5K to 2.5K instructions; or about 4K to 16K bytes). Specifically, because the code pages are ordinarily executed to completion and in a predetermined order, program memories large enough to hold only a single code page at a time may be used without realizing a significant performance penalty. Some processors 32 may optionally have larger program memories 34 than others to accommodate relatively large code pages.

By using small program memories, the present architecture captures the essence of SIMD. SIMD architectures are considered "fine grain" by computer architects because they have minimal resources but replicate these resources a large number of times. As mentioned above, this technique can be a very effective way to harness the power of parallelism. The present parallel architecture is efficient for both multiple tasks and multiple data sets, but remains as "fine grain" as possible.

The ability to divide a program into code pages, as set forth above, is possible for reasons similar to those that enable modern computers to commonly use program and data caches which exploit the properties of temporal and spatial locality. Sequential execution of an instruction sequence demonstrates spatial locality, while having loops embedded within a short piece of code demonstrates temporal locality.

Task Control

Figure 2:
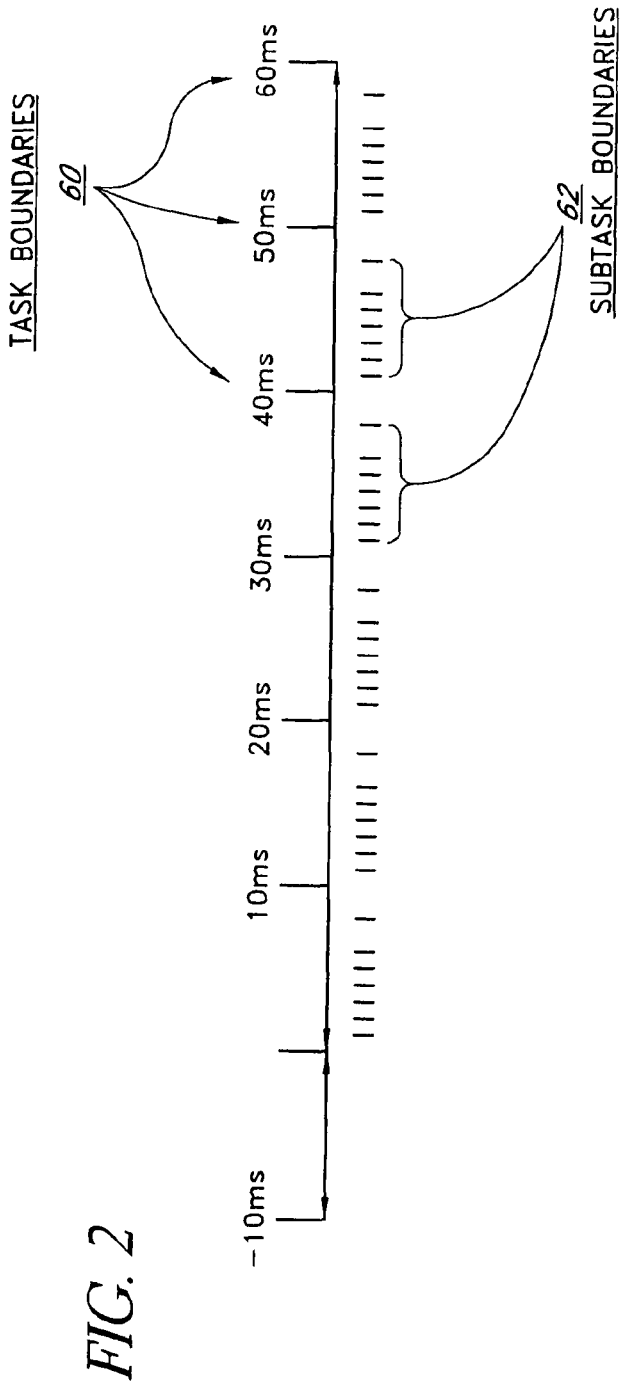
FIG. 2 illustrates example task and code page transitions during program execution.

As described above, each code page generally represents a portion of a larger program or task 50 being executed. FIG. 2 illustrates example task boundaries 60 and code page (subtask) boundaries 62 as a group of cluster processors 32 execute tasks. The markings at the code page boundaries 62 represent the time needed (not drawn to scale) to load a new code page into the program memories 34 of the group of processors 32. If a 200 MHz code distribution bus 42 is used (resulting in two million cycles per 10 ms interval), and each code page is 1024 (1K) instruction words long, the number of clock cycles needed to load a code page is 1024+ overhead clock cycles. If overhead is 100%, about 2048 clock cycles are needed. Ten blocks (code pages) use up 20,480 cycles or about 1% of one 10 ms interval.

It is also possible for one processor 32 to operate on several independent data sets. This may be accomplished either by reloading all code pages for each data set, or by structuring each code page to process several data sets. The latter usually requires more local data memory 35 to store intermediate information, so the former is preferred if time permits (a time-space tradeoff). If a set of code pages is repeated for four data sets, the aforementioned overhead increases to about 4% of available time. Every application will typically have different parameters, but some small amount of time should be budgeted for this task swap method (e.g. 4-15%). In the preferred embodiment, data sets are initialized when the power is turned on, and are maintained by code pages as they execute in real-time. In some embodiments, it may be possible to change the number of data sets as the system runs.

One factor to consider is that code swapping for different tasks is typically interleaved over the same code distribution bus 42. Thus, the markings 62 in FIG. 2 could be shown in different colors, each color representing a different task. Tasks that are not in code swap mode can continue to run. A second factor is that some data manipulation algorithms take more time than others. Due to these complexities, it may be desirable to run a simulation for each task mix.

Figure 4:
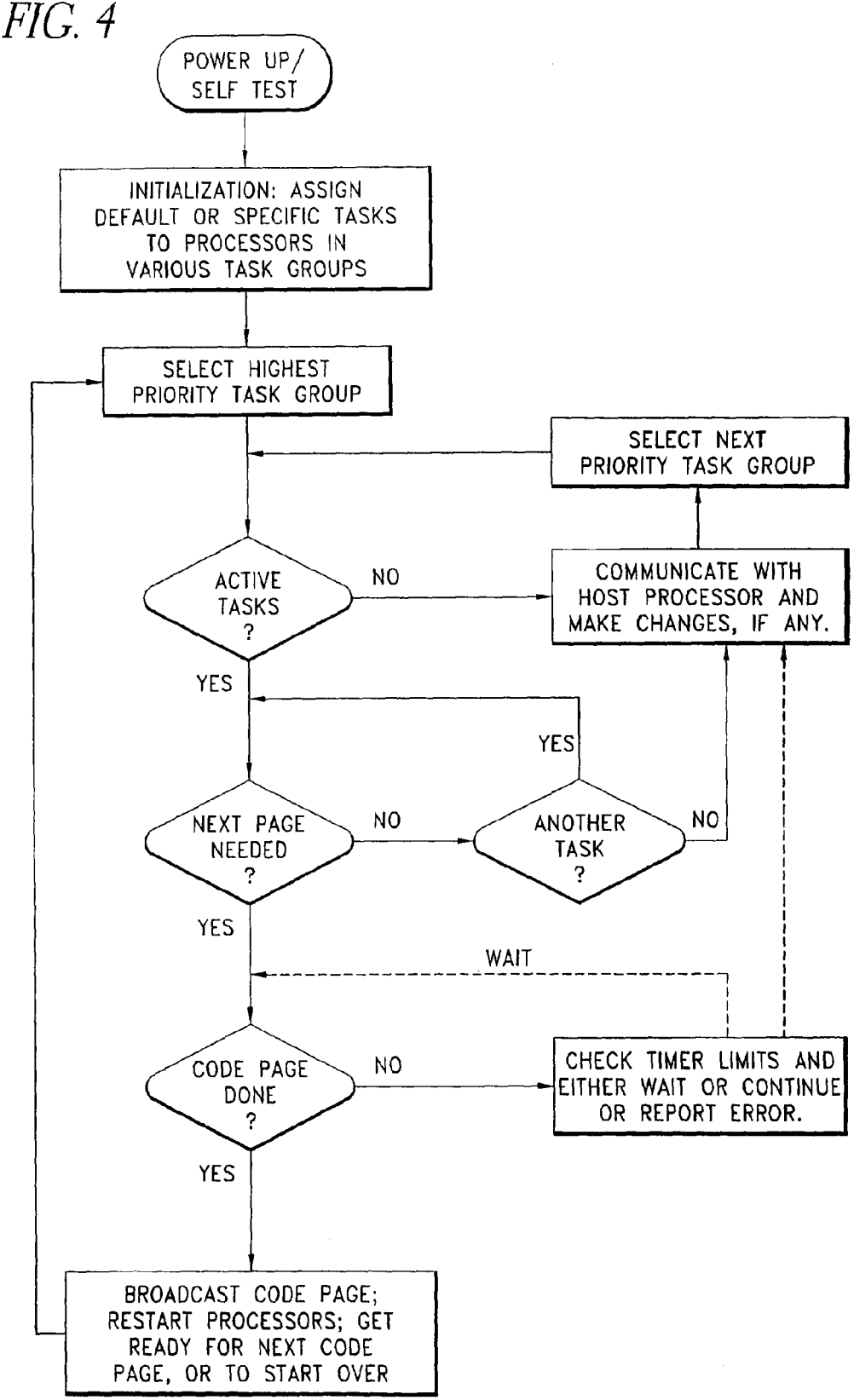
FIG. 4 illustrates one possible flow diagram for the Task Control Processor of FIG. 1.

A preferred way to handle the above issues is to use a software task scheduler and prioritizer 56 (hereinafter "task scheduler") to keep track of the task mix. As depicted in FIG. 1, the task control processor 44 may execute the task scheduler 56 from a local memory 57. Each task mix preferably consists of a fixed or a limited number (e.g., 8) of different tasks. Tasks are prioritized according to the real-time requirement of a particular task's data sets. For example, if one data set has to be revisited every 125 microseconds and another every 1 millisecond, the shorter time interval is assigned a higher priority. Under the control of the task scheduler 56, the task control processor sequences through the code pages associated with these tasks in a fixed order, as shown in FIG. 4. If all code pages have their execution lengths controlled, the timing can be handled by handshaking between the task control processor and the group of processors 32 that are running the particular code page.

Figure 5:
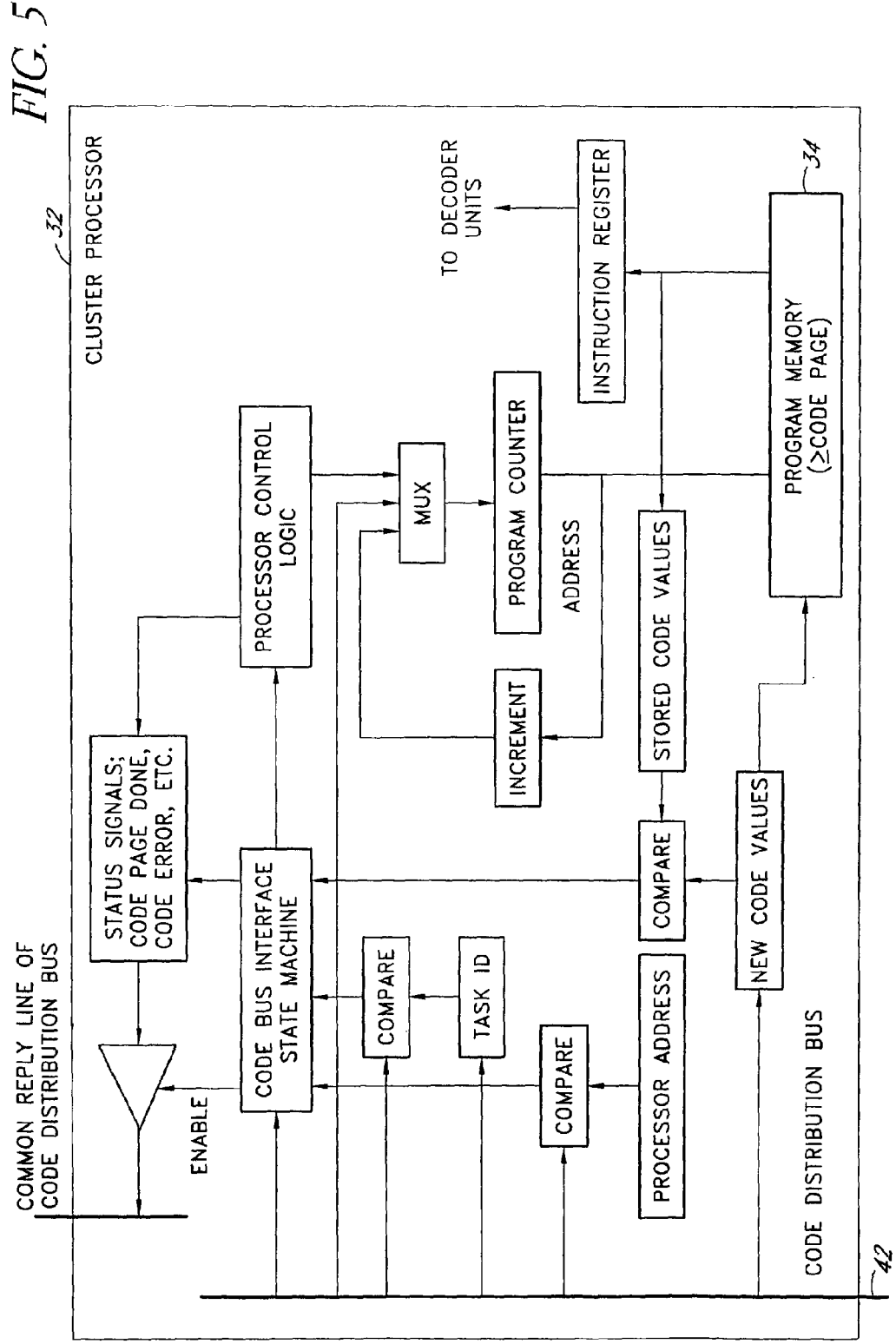
FIG. 5 illustrates details of a cluster processor's code bus interface according to one embodiment of the invention.

In one embodiment, each processor 32 is assigned an address (such as a table row and column position) via hardware so the task control processor 44 can identify and assign specific tasks to individual processors 32 (see FIG. 5). Initialization is preferably handled by the task control processor or through a scan chain interface. After initialization (during which all processors 32 are assigned an initial task ID), each processor 32 waits for its first code page to be loaded and a run command given. At this point, the task control processor starts on its first code page, and asks all processors 32 that will execute that code page if they are ready for a page swap (a time-out mechanism can be implemented to prevent system deadlock, e.g. during code debugging). When all of the processors 32 within the relevant task group are ready, the code page is loaded (broadcast) and the processors are directed to continue. The task control processor then moves on to the next code page (FIG. 4). Even though each processor in a task group executes a copy of the same code page, they may not all finish quite at the same time due to data dependent execution paths. The test for code page completion is thus a synchronizing mechanism in the preferred embodiment.

On special time boundaries, the task control processor may use an independent time source to check for overall timing. This time source may be associated with another task, and may involve a programmable counter which is tied to an independent timing source (e.g. a real-time clock). If the processors 32 are actually halted between code pages, the task control processor 44 may require access to a processor's run control mechanism.

Task Interface Features

In one embodiment, the code distribution bus structure is such that a common set of wires can be used either to transfer a command to a specific cluster processor 32 or to all cluster processors at once. A separate wire is used to specify when the bus is in command mode or in data mode. A bus command may consist of 3 fields: a command function, a processor address, and command data. Processor addresses can consist of a cluster address part, and a processor-within-cluster address part (like choosing a row and column in an array). A special address may be used to signal that all processors should be affected. The command function part signals an action to be performed (see below). The command data part provides additional information to go with the command function (such as a task ID value). The code distribution bus 42 may be wide enough to contain all of these command fields, and be sufficiently wide to transmit multiple instructions at one time. Each cluster processor 32 may have a state machine interface to recognize and execute commands that are addressed to it.

To support the forgoing features, the cluster processors 32, the task control processor 44, and the code distribution bus 42 preferably implement or support the following:

A command to assign a task number to a selected processor 32 (e.g., to assign that processor to a task group). Each processor 32 may include a programmable task ID register for storing this number.

At least one command for broadcasting instructions to processors 32 that have the same "task number." Preferably, a "burst" command is implemented that allows all instructions in a code page to be broadcast one after the other without stopping (once the mechanism is started), e.g. through a sequence such as: write_start, starting_address, instr1, instr2, . . . , instr_last, write_stop.

A command to determine if all processors 32 in a particular task group have finished executing the current code page. For example, a task ID is put on the bus 42, and each processor's current task ID is compared with the one on the bus. If any processor 32 detects a match and is not yet ready for a new code page, that processor forces a common reply signal line (FIG. 5) to the false state.

A command or sequence of commands by which the task control processor may alter a processor's state from "halted" or "suspended" to "running", or from "running" to "halted" or "suspended". In the former case, a method is thereby provided to notify a processor 32 when a code page is ready for execution. When a processor has finished executing a code page it may be desirable for it to execute a small piece of "framework" code that does not need to be reloaded with each code page change. The framework code maintains proper state between page changes.

The bus 42 may also include one or more commands to facilitate program memory testing. In one embodiment, test data (acting like a portion of a code page) is broadcast over the bus 42, and participating processors 32 (with associated logic) have the contents of their program memories 34 compared (word by word) with the broadcast test data, thereby permitting multiple program memories to be tested in parallel (FIG. 5). Error reporting can be handled in a manner similar to how code page execution completion is handled.

Software applications that are intended to execute on a cluster 30 of the type described above preferably have a single entry point, and are designed to either exit or to start over on a new set of data upon reaching a logical end point. Some real world applications, such as voice channel processing, never run out of data, so voice channel processing programs commonly process short bursts of voice data and then start over on the next burst. Other real world applications that run continuously include wireless base station control, multi-media servers, and network switches.

Subdividing Programs into Code Pages

Figure 3:
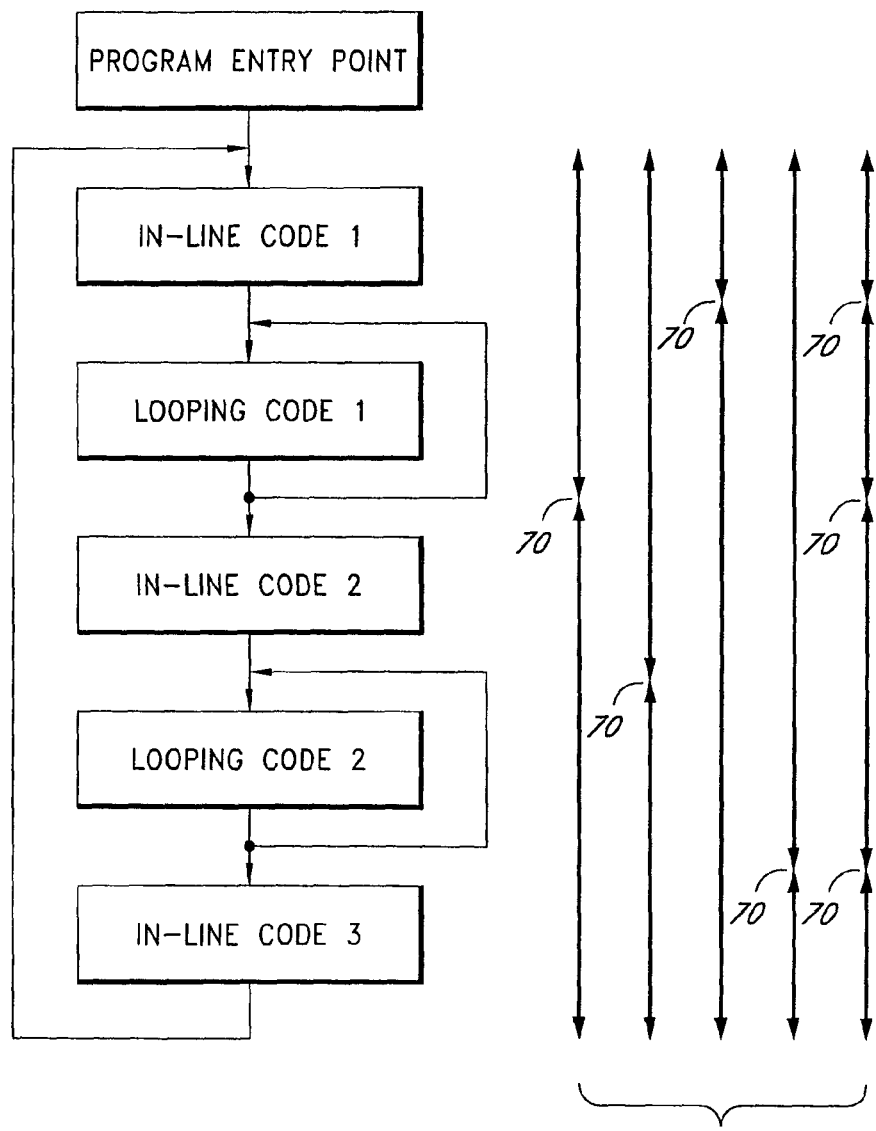
FIG. 3 illustrates example boundary locations for dividing a code sequence into code pages.

FIG. 3 is a flow diagram of a typical software application showing possible code page boundaries 70. These boundaries may be selected by a designer based on an inspection of the compiled application code, or may be selected by an executable program that selects the boundaries based on a set of rules. The boundaries are preferably selected such that every code page may be loaded in its entirety into the local program memory 34 of a processor 32. In the example shown in FIG. 3, it is assumed that all of the processors 32 within the relevant cluster 30 have equal-size program memories 34 of 2K (2048) instructions (words), or 8K bytes if the instructions are 4 bytes each.

In this example, there are 3 blocks of in-line code and 2 blocks of looping code (in general there will be many more blocks of each type). The application can be subdivided into code pages of up to 2K words in several possible ways, as shown in FIG. 3. The most effective subdivision is to have the minimum number of code pages without breaking a significant block of looping code. Each code page preferably executes only once from beginning to the start-over point. A loop can optionally be subdivided into two smaller loops or unrolled into straight code if a suitable code page boundary cannot be found. Because the looping code typically uses up many more processor cycles during execution than is needed to load the code pages, the loading events do not significantly impair performance. This is analogous to the cache miss phenomenon, and resulting performance loss, in a more traditional computer architecture.

As mentioned above, the processors 32 of a cluster 34 may be divided into two or more task groups, each of which executes a different software application or task. In such cases, the task control processor broadcasts code pages over the bus 42 to all processors 32 within a task group, such that the program memories 34 of these processors are loaded in parallel.

Code pages may be sorted according to the order in which they should be loaded by the task control processor. The code page ordering is preferably chosen in advance with the aid of software performance analysis tools and a task mix simulator, taking into consideration timing constraints for each task. The resulting task schedule information may be kept as tables (not shown) in task control processor's local memory 57. This schedule information may be loaded from the host processor 36, or via another agent such as a boundary scan interface, during the power up sequence.

Voice Channel Processing

As an example of how the current architecture may be applied to a real application, consider how voice channels may be processed. There are several standards and proprietary methods for processing voice channels. Let a task consist of a group of standard voice processing algorithms (as programs and code pages). Such a task may, for example, perform voice activity detection, silence suppression, echo cancellation, and/or voice compression, and may run continuously on each processor 32 within a task group. There can be several such tasks, each of which may differ in some respects, such as the amount of voice compression provided or the length of echo tail processed. Different tasks may be assigned to different task groups within the same cluster 30, or spread across multiple clusters.

In the preferred embodiment, a single cluster processor 32 is restricted to one task at a time, and depending upon the capability of each processor 32, one or more voice channels can be assigned to it (via communication with a host processor 36). Voice channel assignment to processors is preferably done by prior system analysis and modeling. Small changes can optionally be handled dynamically. Voice data samples are fed to each processor 32 through the shared cluster global memory 40 at regular intervals by a higher-level processor 38. Some intervals may be as short as a few multiples of the basic telephony sample period of 125 microseconds, and some may be 5 to 30 milliseconds, depending upon various voice compression algorithms. Code pages are dispatched to the processors 32 in a task group in such a way that incoming voice samples are consumed at their incoming rate. Modified voice sample outputs are also produced at the same rate, all through the shared cluster global memory 40.

Hierarchical Bus Structure

FIG. 6 illustrates one example how multiple clusters 30 of the type described above may be interconnected within an integrated circuit device. In this example, the clusters 30 are arranged within a 2-level hierarchy with one root cluster 30 and J leaf clusters. The root cluster contains K processors 32, and each leaf cluster contains L processors 32.

All processors 32 of all clusters 30 in this example are coupled to a common code distribution bus 42, and are managed (receive code pages, etc.) by a common task control processor 44. Multiple code distribution bus/task control processor pairs may alternately be provided, each of which services a different cluster 30 or group of clusters.

Each cluster 30 in the hierarchy includes a bus cycle unit 60 that controls accesses to that cluster's shared memory 40. The shared memory 40 of the root cluster may be omitted. Each leaf level processor 32 can only access the shared memory 40 within its respective cluster 30, and not other shared memories, in the preferred embodiment. Each root level processor, however, can access the shared memory 40 of the root cluster 30 (if provided) and the shared memories 40 of the leaf clusters.

Each bus cycle assignment unit 60 controls memory accesses by allocating timeslots on its respective bus 62 to specific processors 32. The timeslots may be allocated to processors according to a round robin protocol, although other types of assignment protocols may alternatively be used. Each leaf-level bus cycle assignment unit 60 allocates timeslots to L leaf processors 32 as well as processing requests from the K root processors 32, whose time slots are allocated by the root level bus cycle assignment unit. With this hierarchical arrangement, the root-level processors 32 may, for example, be used primarily to load input datasets into, and to read output datasets from, the shared memories 40 of the leaf clusters. The processors 32 of the leaf clusters 30, on the other hand, may execute one or more signal processing tasks (echo cancellation, voice compression, etc.).

The preferred number of processors (L) in a leaf cluster 30 depends on how much contention can be tolerated in the global memories 40. For a regular array, L might be about the square root of N, where N is the total number of processors 32 in the leaf clusters. There is also a dependence on the lengths of the code distribution bus 32 and memory data and address busses. These buses should be short enough (i.e., lightly loaded) to support single clock cycle data transfer. However, multiple clocks per transfer are also possible. Typical ranges for J, K, and L are as follows L=4-10; K=3-6, and J=4-10.

Additional details of the hierarchical bus structure depicted in FIG. 6 are disclosed in a concurrently-filed U.S. patent application by Hobson et al. titled HIERARCHICAL BUS STRUCTURE AND MEMORY ACCESS PROTOCOL FOR MULTIPROCESSOR COMMUNICATIONS (application Ser. No. 10/369,340, filed Feb. 18, 2003), and by corresponding U.S. provisional application No. 60/358,133, filed, Feb. 19, 2002, the disclosures of which are hereby incorporated by reference.

Although this invention has been described in terms of certain preferred embodiments and applications, other embodiments and applications that are apparent to those of ordinary skill in the art, including embodiments and applications which do not provide all of the features and advantages set forth herein, are also within the scope of this invention. Accordingly, the scope of the present invention is intended to be defined only by reference to the appended claims.

What is claimed is:

1. A method comprising:
    a plurality of processors receiving a broadcast comprising a plurality of code sequences, wherein individual of the code sequences are associated with individual of a plurality of task-group identifiers;
    storing the individual code sequences into one or more local program memories of the plurality of processors, wherein individual processors are associated with individual of the plurality of task-group identifiers;
    executing a stored code sequence during a first time interval by a first processor included in the plurality of processors associated with a task-group identifier corresponding to the task-group identifier associated with the stored code sequence; and
    executing the stored code sequence during a second time interval by a second processor included in the plurality of processors associated with the task-group identifier corresponding to the task-group identifier associated with the stored code sequence, wherein the first time interval and the second time interval at least partially overlap in time.

2. The method of claim 1, further comprising:
monitoring the execution of the stored code sequence by the first and second processors; and
loading a next code sequence into at least one local program memory in response to an indication that execution of the stored code sequence by the first and second processors has been completed.

3. The method of claim 1, wherein storing the code sequences into the one or more local program memories comprises loading the code sequences into the one or more local program memories one code sequence at time.

4. The method of claim 1, wherein individual processors are configured to process respectively different data streams in substantially real time.

5. The method of claim 4, wherein the first and second processors are configured to follow different execution paths as the first and second processors execute the same code sequence, wherein each execution path is based on the respective data stream processed by the particular processor.

6. The method of claim 5, further comprising determining whether the first and second processors have completed executing the stored code sequence.

7. The method of claim 1, wherein the stored code sequence comprises a program loop.

8. A method comprising:
receiving a plurality of code segments broadcasted via a code distribution device, wherein individual of the code segments are associated with individual of a plurality of task groups, and wherein the plurality of task groups include a first task group comprising a first plurality of processors and a second task group comprising a second plurality of processors;
storing a first code segment associated with the first task group into at least one local program memory of the processors of the first task group;
storing a second code segment associated with the second task group into at least one local program memory of the processors of the second task group;
executing the first code segment by a first processor and a second processor of the first task group during respective timeframes, wherein the timeframe during which the first processor of the first task group executes the first code segment at least partially overlaps the timeframe during which the second processor of the first task group executes the first code segment; and
executing the second code segment by a first processor and a second processor of the second task group during respective timeframes, wherein the timeframe during which the first processor of the second task group executes the second code segment at least partially overlaps the timeframe during which the second processor of the second task group executes the second code segment.

9. The method claim 8, wherein individual processors of the first and second task groups are associated with a task-group identifier, and wherein individual code segments are associated with at least one task-group identifier.

10. The method claim 8, further comprising:
monitoring the execution of the first and second code segments; and
loading a third code segment into at least one local program memory in response to an indication that execution of at least one of the first and second code segments has completed.

11. The method claim 8, wherein the first and second code segments are loaded into respective local program memories one at a time.

12. The method claim 8, wherein the processors of the first task group are associated with a first local program memory and the processors of the second task group are associated with a second local program memory.

13. The method claim 8, wherein the processors of the first and second task groups and the local program memories associated with the first and second task groups are integrated within a common integrated circuit device.

14. The method claim 8, further comprising:
receiving data at the processors of the first and second task groups from a common memory configured to be shared by the first and second task groups; and
outputting data from the processors of the first and second task groups to the common memory.

15. The method claim 8, further comprising processing different data sets during execution of a code segment by the first and second processors of at least one of the first and second task groups.

16. The method claim 8, further comprising processing respectively different data streams by the first and second processors of the first task group in substantially real time.

17. The method claim 8, wherein the first processor of the first task group is configured to follow an execution path that is different from an execution path followed by the second processor of the first task group during execution of the first code segment.

18. The method claim 8, wherein at least one code segment comprises a program loop.

19. The method claim 8, further comprising:
determining whether the first and second processors of the first task group have finished executing the first code segment; and
determining whether the first and second processors of the second task group have finished executing the second code segment.

20. An article of manufacture including a computer-readable storage device having instructions stored thereon, the instructions comprising:
instructions for receiving a plurality of code sequences broadcasted via a code distribution device, wherein individual of the code sequences are associated with individual of a plurality of task-group identifiers;
instructions for storing the individual code sequences into one or more local program memories of at least one of a plurality of processors, wherein individual processors are associated with individual of the plurality of task-group identifiers;
instructions for executing a stored code sequence during a first time interval by a first processor associated with a task-group identifier corresponding to the task-group identifier associated with the stored code sequence; and
instructions for executing the stored code sequence during a second time interval by a second processor associated with the task-group identifier corresponding to the task-group identifier associated with the stored sequence, wherein the first time interval and the second time interval at least partially overlap in time.

21. The article of manufacture of claim 20, further comprising:
instructions for monitoring the execution of the stored code sequence by the first and second processors; and
instructions for loading a next code sequence into at least one local program memory in response to an indication that execution of the stored code sequence by the first and second processors has been completed.

22. The article of manufacture of claim 20, wherein the instructions for storing the code sequences into the one or more local program memories comprises instructions for loading the code sequences into the one or more local program memories one code sequence at time.

23. The article of manufacture of claim 20, wherein individual processors are configured to process respectively different data streams in substantially real time.

24. The article of manufacture of claim 20, further comprising
instructions for determining whether the processors associated with the task-group identifier corresponding to the task-group identifier associated with the stored code sequence have completed executing the stored code sequence.

25. The article of manufacture of claim 20, wherein the stored code sequence comprises a program loop.

26. An article of manufacture including a computer-readable storage device having instructions stored thereon, the instructions comprising:
instructions for receiving a plurality of code segments broadcasted via a code distribution device, wherein individual of the code segments are associated with individual of a plurality of task groups, and wherein the plurality of task groups include a first task group comprising a first plurality of processors and a second task group comprising a second plurality of processors;
instructions for storing a first code segment associated with the first task group into at least one local program memory of the processors of the first task group;
instructions for storing a second code segment associated with the second task group into at least one local program memory of the processors of the second task group;
instructions for executing the first code segment by a first processor and a second processor of the first task group during respective timeframes, wherein the timeframe during which the first processor of the first task group executes the first code segment at least partially overlaps the timeframe during which the second processor the first task group executes the first code segment; and
instructions for executing the second code segment by a first processor and a second processor of the second task group during respective timeframes, wherein the timeframe during which the first processor of the second task group executes the second code segment at least partially overlaps the timeframe during which the second processor the second task group executes the second code segment.

27. The article of manufacture of claim 26, wherein individual processors of the first and second task groups are associated with a task-group identifier, and wherein individual code segments are associated with at least one task-group identifier.

28. The article of manufacture of claim 26, further comprising:
instructions for monitoring the execution of the first and second code segments; and
instructions for loading a third code segment into at least one local program memory in response to an indication that execution of at least one of the first and second code segments has completed.

29. The article of manufacture of claim 26, wherein the first and second code segments are loaded into respective local program memories one at a time.

30. The article of manufacture of claim 26, wherein the processors of the first task group are associated with a first local program memory and the processors of the second task group are associated with a second local program memory.

31. The article of manufacture of claim 26, wherein the processors of the first and second task groups and the local program memories associated with the first and second task groups are integrated within a common integrated circuit device.

32. The article of manufacture of claim 26, further comprising
instructions for receiving data at the processors of the first and second task groups from a common memory configured to be shared by the first and second task groups; and
instructions for outputting data from the processors of the first and second task groups to the common memory.

33. The article of manufacture of claim 26, further comprising
instructions for processing different data sets during execution of a code segment by the first and second processors of at least one of the first and second task groups.

34. The article of manufacture of claim 26, further comprising
instructions for processing respectively different data streams by the first and second processors of the first task group in substantially real time.

35. The article of manufacture of claim 26, wherein the first processor of the first task group is configured to follow an execution path that is different from an execution path followed by the second processor of the first task group during execution of the first code segment.

36. The article of manufacture of claim 26, wherein at least one code segment comprises a program loop.

37. The article of manufacture of claim 26, further comprising:
instructions for determining whether the first and second processors of the first task group have finished executing the first code segment; and
instructions for determining whether the first and second processors of the second task group have finished executing the second code segment.

38. A method comprising:
a plurality of processors receiving a plurality of code segments, wherein individual code segments are associated with individual task-groups;
storing an identifier corresponding to a first task-group in one or more registers of one or more processors of the plurality of processors;
storing a code segment associated with the first task-group into one or more local program memories of the one or more processors; and
executing the stored code segment by the one or more processors.

39. The method of claim 38, wherein executing the stored code segment by the one or more processors comprises:
executing the stored code segment during a first time interval by a first processor of the one or more processors; and executing the stored code segment during a second time interval by a second processor of the one or more processors, wherein the first time interval and the second time interval at least partially overlap in time.

40. The method of claim 39, wherein the first processor is configured to execute the stored code segment with a first dataset and wherein the second processor is configured to execute the stored code segment with a second dataset.

41. The method of claim 38, further comprising:
monitoring the execution of the stored code segment by the one or more processors; and
storing a next code segment associated with the first task-group into the one or more local program memories of the one or more processors in response to an indication that the one or more processors have completed execution of the stored code segment.

42. The method of claim 38, wherein the stored code segment comprises a program loop.

43. A system comprising:
a first task group comprising one or more processors, wherein individual processors of the first task group include a respective register configured to store a first task group identifier;
a second task group comprising one or more processors, wherein individual processors of the second task group include a respective register configured to store a second task group identifier; and
a task controller configured to distribute a plurality of code segments via a code distribution device configured to provide communications between the task controller and the first and second task groups, wherein at least some of the plurality of code segments are associated with the first task group, wherein at least some of the plurality of code segments are associated with the second task group, and wherein the plurality of code segments is stored into one or more local program memories of the first task group and the second task group.

44. The system of claim 43, wherein the first task group comprises:
a first processor configured to execute a first code segment associated with the first task group during a first time interval; and
a second processor configured to execute the first code segment associated with the first task group during a second time interval, wherein the first time interval and the second time interval at least partially overlap.

45. The system of claim 44, wherein the first processor is configured to follow a first execution path during execution of the first code segment, and wherein the second processor is configured to follow a second execution path during execution of the first code segment.

46. The system of claim 44, wherein the first processor is configured to execute the first code segment with a first dataset and wherein the second processor is configured to execute the first code segment with a second dataset.

47. The system of claim 44, wherein the task controller is further configured to determine whether the processors of the first task group have completed executing the first code segment associated with the first task group, and in response to determining that the processors of the first task group have completed executing the first code segment, distribute a second code segment associated with the first task group via the code distribution device.

48. The system of claim 43, wherein individual of the plurality of code segments comprise a program loop.

49. The system of claim 43, wherein the one or more local program memories of the first task group and the second task group comprise:
a first set of one or more local program memories of the first task group, wherein individual of the first set of local program memories are configured to store code sequences associated with the first task group; and
a second set of one or more local program memories of the second task group, wherein individual of the second set of local program memories are configured to store code sequences associated with the second task group.

50. The system of claim 43, further comprising:
a common set of one or more memories associated with the first and second task groups, wherein individual of the common set of memories are configured to store code sequences associated with first and second task groups.

51. The system of claim 43, wherein the task controller is further configured to assign code sequences to a particular task group based at least in part on the task group identifiers stored in the registers of the individual processors of the particular task group.

52. The system of claim 43, wherein the first task group, second task group, and task controller are implemented in one integrated circuit.

* * * * *

UNITED STATES PATENT AND TRADEMARK OFFICE
CERTIFICATE OF CORRECTION

| | | |
|---|---|---|
| PATENT NO. | : 8,489,857 B2 | Page 1 of 1 |
| APPLICATION NO. | : 12/940799 | |
| DATED | : July 16, 2013 | |
| INVENTOR(S) | : Hobson et al. | |

It is certified that error appears in the above-identified patent and that said Letters Patent is hereby corrected as shown below:

In the Specifications

In Column 3, Line 31, delete "invention;" and insert -- invention. --, therefor.

In Column 5, Line 10, delete "memories 42" and insert -- memories 34 --, therefor.

In Column 9, Line 4, delete "cluster 34" and insert -- cluster 30 --, therefor.

In Column 10, Line 28, delete "bus 32" and insert -- bus 42 --, therefor.

In the Claims

In Column 11, Line 61, in Claim 9, delete "method" and insert -- method of --, therefor.

In Column 11, Line 65, in Claim 10, delete "method" and insert -- method of --, therefor.

In Column 12, Line 5, in Claim 11, delete "method" and insert -- method of --, therefor.

In Column 12, Line 8, in Claim 12, delete "method" and insert -- method of --, therefor.

In Column 12, Line 12, in Claim 13, delete "method" and insert -- method of --, therefor.

In Column 12, Line 16, in Claim 14, delete "method" and insert -- method of --, therefor.

In Column 12, Line 23, in Claim 15, delete "method" and insert -- method of --, therefor.

In Column 12, Line 27, in Claim 16, delete "method" and insert -- method of --, therefor.

In Column 12, Line 30, in Claim 17, delete "method" and insert -- method of --, therefor.

In Column 12, Line 36, in Claim 18, delete "method" and insert -- method of --, therefor.

In Column 12, Line 38, in Claim 19, delete "method" and insert -- method of --, therefor.

Signed and Sealed this
Thirteenth Day of May, 2014

Michelle K. Lee
*Deputy Director of the United States Patent and Trademark Office*